United States Patent [19]

Hauffe et al.

[11] 4,365,393
[45] Dec. 28, 1982

[54] SINGLE AND MULTIPLE SECTION PIPE REPAIR CLAMPS

[75] Inventors: William L. Hauffe, Warrensburg; Joseph L. Daghe, Decatur, both of Ill.

[73] Assignee: Mueller Co., Decatur, Ill.

[21] Appl. No.: 262,776

[22] Filed: May 11, 1981

[51] Int. Cl.$^3$ .............................................. F16L 33/04
[52] U.S. Cl. ..................... 24/279; 285/373; 138/99
[58] Field of Search ........................ 24/279, 284, 285; 285/373; 138/99

[56] References Cited

U.S. PATENT DOCUMENTS

| | | | |
|---|---|---|---|
| 1,641,559 | 9/1927 | Thompson | 24/279 |
| 1,970,078 | 8/1934 | Dillon | 285/373 |
| 2,028,609 | 1/1936 | Irwin | 24/279 |
| 2,278,714 | 4/1942 | Stauffer | 24/279 |
| 2,339,759 | 1/1944 | Bidwell | 24/279 |
| 2,341,828 | 2/1944 | Tetzlaff | 24/279 |
| 2,651,095 | 9/1953 | Kates | 24/279 |
| 2,688,170 | 9/1954 | Balzer | 24/279 |
| 3,110,948 | 11/1963 | Voss | 24/279 |
| 3,565,468 | 2/1971 | Garrett | 24/279 |
| 3,861,723 | 1/1975 | Kunz et al. | 24/279 |

FOREIGN PATENT DOCUMENTS 621406  4/1949  United Kingdom ................ 24/279

*Primary Examiner*—Paul J. Hirsch
*Assistant Examiner*—John J. Wilson
*Attorney, Agent, or Firm*—Cushman, Darby & Cushman

[57] ABSTRACT

A low profile pipe clamp for use in encircling a pipe such as a main or the like, the clamp being either a repair clamp or a service clamp with a side outlet. The pipe clamp comprises a flexible band, usually of sheet metal with a gasket material on the interior and having at least a pair of opposed looped ends which receive cylindrical trunnion loading bars. At least one bolt extending through the loading bars is arranged to move the trunnion loading bars toward each other to cause the looped ends of the band to draw the flexible band tightly around the pipe. The relationship of the trunnion loading bars to the bolt extending therethrough is such as to give the clamp a use for a wide range of varying outside diameters of a particular size of pipe. Means are provided for retaining the bolt in one of the loading bars prior to assembly of the clamp on a pipe, and also means are provided for frictionally holding the trunnion loading bars in a predetermined position in the looped ends of the flexible band prior to assembly of the clamp on a pipe but yet let the trunnion loading bars rotate relative the looped ends during assembly. The loading bars are capable of removal from the looped ends if it is desired to replace the same.

17 Claims, 16 Drawing Figures

SINGLE AND MULTIPLE SECTION PIPE REPAIR CLAMPS

The present invention relates to improvements in low profile pipe clamps of the type having a split flexible band means with at least one pair of opposed spaced apart looped ends having trunnions therein and bolt means for drawing the trunnions and the looped ends towards one another so that the band means tightly encircles the pipe. More particuarly, the present invention relates to an improvement in such clamps wherein the clamp has a use for a wider range of varying outside diameters of a particular size of pipe than heretofore realized. The arrangement of the bolt means with respect to the trunnion loading bars is such that the bolt means exerts a greater torque to rotate the trunnion loading bars within the looped ends of the band, thereby reducing bending loads on the bolt means while permitting more of the bolt tightening torque to be transmitted to the gasket of the clamp.

BACKGROUND OF THE INVENTION

Pipe clamps of the type utilizing split flexible bands for encircling the pipe have heretofore been provided with looped opposed ends carrying trunnion loading bars, the looped ends being drawn toward each other by bolts extending through the trunnion bars. The prior art arrangements for clamps utilizing split flexible bands for encircling the pipe have a limited range because of interference between the bolt means and the split flexible band on the larger diameter pipes of a particular size. The limited range resulted from the bolt apertures in the trunnion bars having axes extending through the axes of the trunnion bars.

Pipes of a particular nominal size are manufactured from a variety of basic materials by different manufacturers. These materials can be cast iron, ductile iron, steel, plastic, asbestos-cement, etc. These pipes are generally manufactured to some nominal size and the outside diameter is then determined by the intended usage, the desired pressure rating and the pipe material being used. It is quite possible, therefore, for a pipe designated as one particular size to have a wide variety of outside diameters depending on the material being used to manufacture the pipe. Thus, a pipe designated 6 inch, but made from these various materials could range in outside diameter from 6.00 inches to perhaps 7.62 inches. This total variation would not occur in any one pipe material, but instead, encompasses a multitude of pipe materials and their various manufacturing tolerances.

In the prior arrangements of pipe clamps for use where the outside diameters of a particular size of pipe vary, the size of a minimum diameter pipe establishes the design of the clamp and particularly the length of the flexible band as the loops of the split flexible band must not engage one another, otherwise the clamp cannot maintain or generate a load over the entire flexible band which will cause sufficient compression of the gasket of the band for the intended purpose. When such a pipe clamp is designed, its limit for a maximum diameter is determined by any interference between the bolts and any other component parts of the clamp such as the gap bridge portion of the split flexible band. In the past, to avoid interference at the maximum range, the minimum range of the clamp was sacrificed and, thus, the overall utility of the clamp was reduced. To increase the range of the clamp at the maximum end without reducing its utility at the minimum end of the range, the looped ends of the flexible band were increased in diameter with the trunnion bars likewise being increased in diameter, although the bolt size remained the same. However, this type of approach to obtain a better maximum range was unsatisfactory as such changes to the clamp design increased both the cost and the weight of the clamp. Additionally, such design changes interfere with the low profile design of the clamp by increasing the problem of wrapping for corrosion protection and also increasing the likelihood of the clamp being hit by digging equipment during future excavations.

PRIOR ART

Prior art patents relating to flexible split band pipe clamps utilizing trunnion bars in the looped spaced ends of the bands are as follows:

| | | |
|---|---|---|
| 1,641,559 | Thompson | Sept. 6, 1927 |
| 2,028,609 | Irwin | Jan. 21, 1936 |
| 2,339,759 | Bidwell | Jan. 25, 1944 |
| 2,341,828 | Tetzlaff | Feb. 15, 1944 |
| 3,110,948 | Voss | Nov. 19, 1963 |
| 3,565,468 | Garrett | Feb. 23, 1971 |
| 3,861,723 | Kunz et al | Jan. 21, 1975 |

In each of the clamps disclosed in the above patents, the trunnion bars in the looped ends of the flexible band have apertures therethrough for the bolt means which have axes extending through the center line of the trunnion bar and, thus, the axis of the bolt used would be through the trunnion axis. To increase the range of such clamps at the upper end for a maximum diameter of pipe encountered, it was necessary to increase the diameter of the trunnion bars or conversely reduce the diameter of the bolt means extending through the trunnion bars, thus avoiding interference of the bolt with the flexible band means. By increasing the diameter of the trunnion bars, the looped ends also had to be increased in size and, thus, the cost of manufacture of such a clamp increased due to an increased use of material. Another disadvantage of such a design change was the increase in weight of the pipe clamp. Further, the profile of the clamp increased and, thus, the clamp was more difficult to wrap and more likely to be damaged by being hit with digging equipment during future excavations. On the other hand, if the size of the bolt was reduced, then the amount of bolt torque had to be reduced to avoid bolt overloading, and ultimately the amount of compression which can be applied to the gasket of the clamp was reduced.

BRIEF SUMMARY OF THE INVENTION

The present invention relates to an improved low profile pipe clamp for encircling a pipe, the clamp having a use for a wide range of varying outside diameters of a particular size of pipe. The clamp comprises a split flexible band means having at least one pair of opposed spaced apart looped ends extending in a lengthwise direction of the pipe when the flexible band means encircles the pipe, and each of the looped ends carries an elongated trunnion loading bar, the trunnion loading bar being rotatable relative to its respective looped end when the pair of looped ends are drawn toward one another. Bolt means coacting with the trunnion bars move the trunnion bars toward one another so as to draw the opposed looped ends toward each other with the band means tightly encircling the pipe. The bolt means includes at least one bolt extending through the trunnion bars, the bolt having a longitudinal axis extending transversely of and spaced outwardly of the longtudinal axes of the trunnion bars whereby the bolt avoids interference with the flexible band means when the pipe clamp is used on a pipe having a maximum diameter for a particular size of that pipe.

By having the bolt's center line spaced outwardly of the trunnion loading bars' center lines, the maximum range of the clamp is increased while maintaining adequate sealing of the gasket of the band means throughout the range.

Each of the trunnion loading bar bolts exerts somewhat more torque for rotating the trunnion loading bars relative to the looped ends of the flexible band and thereby reduces bending loads on the bolt which results in more bolt tightening torque being transmitted to the gasket and improving the gasket's ability to seal.

Ancillary to the above advantages, the trunnion bars are frictionally retained in the looped ends of the flexible band means prior to installation of the clamp, the friction being capable of being overcome during assembly of the clamp on a pipe so that the trunnion bars can rotate relative to the looped ends. The particular friction means permits the trunnion loading bars to be removed and replaced if necessary.

The bolt is retained in the unthreaded aperture of one of the trunnion bars prior to assembly, the other trunnion bar having a threaded aperture for receiving the bolt during assembly. By such an arrangement, parts of the clamp are not lost during shipment, and assembly of the clamp on a pipe in cramped quarters or under more difficult conditions is made more simple as nuts do not have to be threaded on the bolts during assembly, and there is no chance of losing component parts.

DETAILED DESCRIPTION OF THE INVENTION

Figure 1:
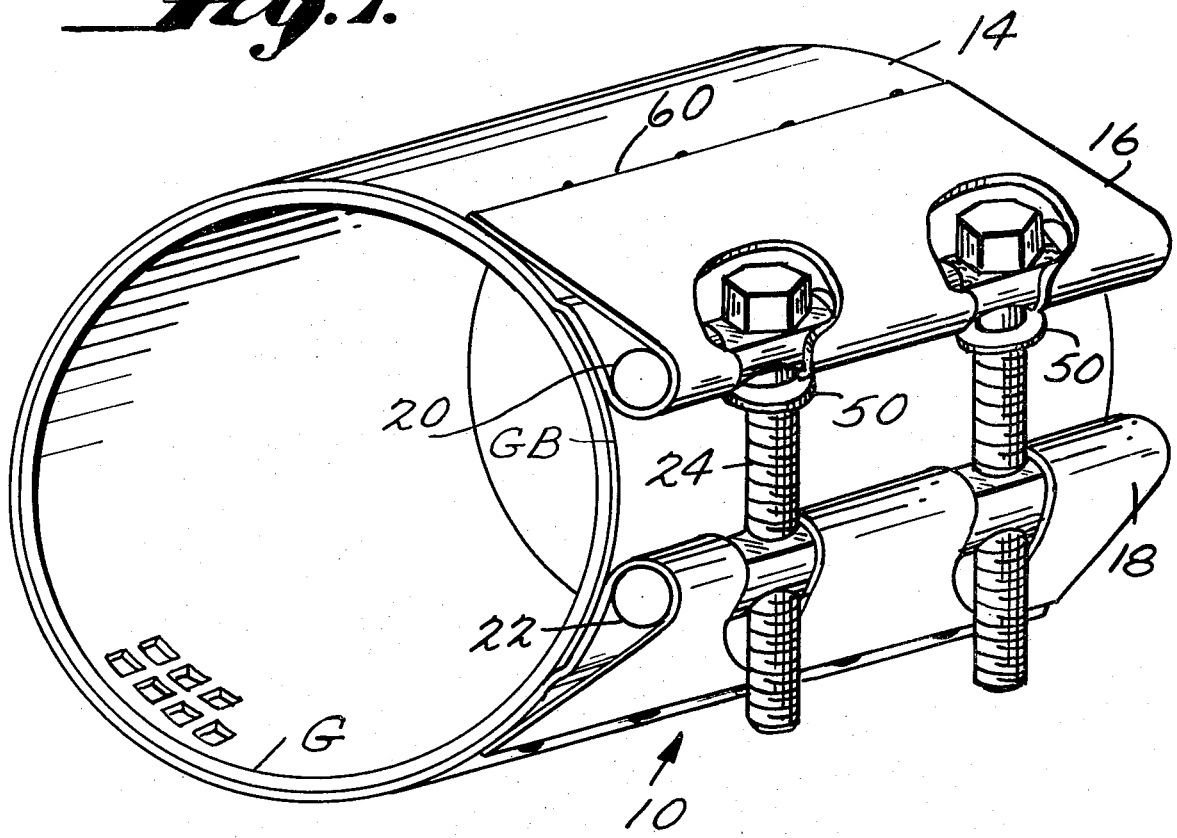
FIG. 1 is a perspective view of the pipe clamp of the present invention, the pipe about which the clamp encircles being omitted for the purpose of clarity.
Figure 2:
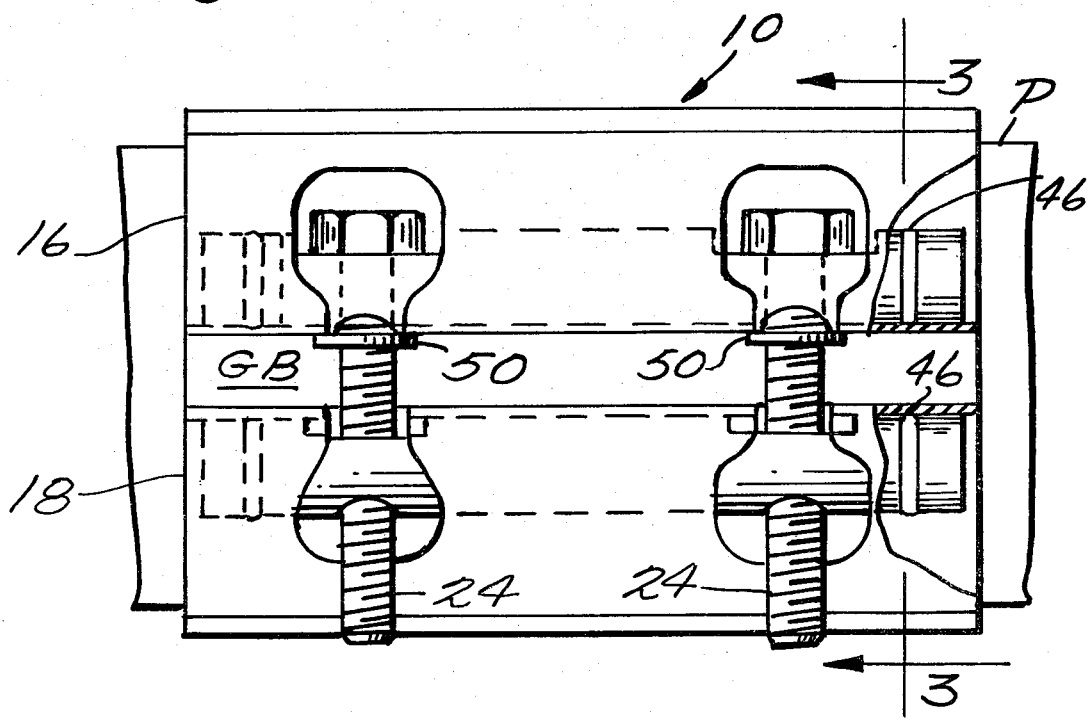
FIG. 2 is a plan view normal to the plane of the bolts of the pipe clamp of FIG. 1, a portion of the flexible band means being broken away so as to disclose the friction means for retaining the trunnion loading bars in the looped ends of the band means.
Figure 3:
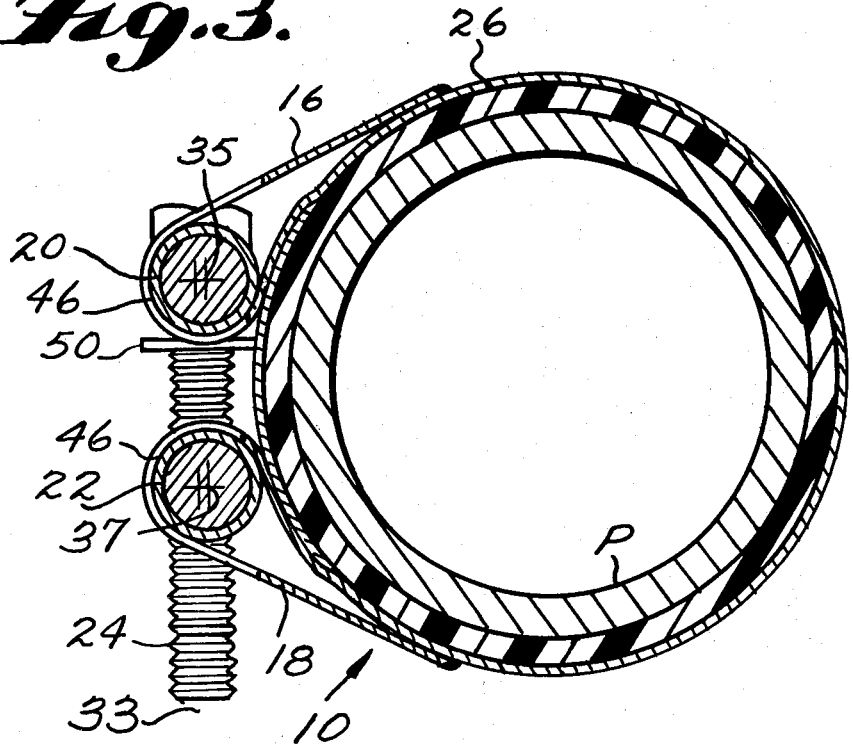
FIG. 3 is a sectional view of the pipe clamp taken on the line 3—3 of FIG. 2 but the view being rotated 90 degrees in counterclockwise direction.

Referring now to the drawings wherein like character or like reference numerals represent like or similar parts, and in particular to FIGS. 1 through 3, inclusive, there is shown a low profile pipe clamp of the present invention, the same being generally designated at 10. The pipe clamp 10 encircles a pipe or main P and may be of the type for repairing holes or cracks in the pipes, or it may be of the type provided with a service side outlet to which a service pipe is connected, such as disclosed in U.S. Pat. No. 3,467,943, issued Sept. 16, 1969, to Philip N. Adams, and assigned to the same assignee, Mueller Co., Decatur, Ill.

The low profile pipe clamp 10 includes a split flexible band means 14 which completely encircles the pipe P, the band means being provided with opposed looped ends 16 and 18. The looped ends 16 and 18 are provided with trunnion loading bars 20 and 22, respectively, the trunnion bars 20 and 22 being movable toward one another by bolt means 24. When the trunnion bars 20 and 22 are moved towards one another, they draw the looped ends toward each other to cause the band means to tightly encircle the pipe P. The interior of the band means carries a gasket member G made of a resilient or elastomeric material such as rubber, rubber substitutes or the like, the gasket tightly compressing against the pipe wall to provide a fluid-tight seal therewith. The band means 14 is usually provided with a gap bridge GB extending between the looped ends 16 and 18.

The flexible band means 14 is made from a suitable rust-resistant noncorrosive sheet metal material such as stainless steel or the like, although it may be made from plastic materials. Generally, the band means 14 is pre-curved to provide a semi-cylindrical portion having a radius of curvature which permits it to be flexed above a pipe of a particular size for which the clamp was designed. For small diameter pipe size, the split flexible band means 14 may be made from a single band of sheet material and, thus, would only have a pair of opposed looped ends 16 and 18, one pair of trunnion bars 20 and 22, and at least one bolt means 28 for drawing the band means tightly around the pipe. On the other hand, if the pipe clamp 10 is intended to be used for a very large diameter pipe size, then the band means may have been made up of at least two, and sometimes more, arcuate sections of sheet material and each section having looped ends with the opposed looped ends of adjacent sections being each provided with the necessary trunnion bars and bolt means tightening the clamp around the pipe.

Pipes or mains P are manufactured by various companies from many different materials in a number of standard nominal sizes. One of the determining factors in the manufacture of this pipe P is the internal diameter which determines its use in a water or gas distribution system. The materials used in the manufacture of the pipe will vary depending on the end use of the pipe so far as flowing fluid and the pressures that are to be contained. Consequently, the outside diameters of standard nominal pipes can vary by large amounts due to the above factors coupled with the manufacturing tolerances allowed by the pipe manufacturers.

Pipe repair clamps are manufactured in different sizes, each size to accommodate a use with a particular standard pipe size but, as pointed out above, a particular standard pipe size can have a varying outside diameter and, consequently, the pipe clamps must be such that they can accommodate these varying differences encountered. In the design of pipe clamps, the length of the metal band is established by determining what the expected minimum outside diameter will be encountered for a particular standard pipe size. The reason for this design factor is that when the pipe clamp is applied to a pipe of a particular size but having a minimum outside diameter for that size pipe, the looped ends of the band, when drawn toward one another, must have a small gap between the same in order to insure that a load has been generated over the entire band to sufficiently compress the gasket material for a proper seal. The maximum diameter of pipe which such a clamp can accommodate is then controlled by the interference of the bolt means with the band means.

Figure 4:
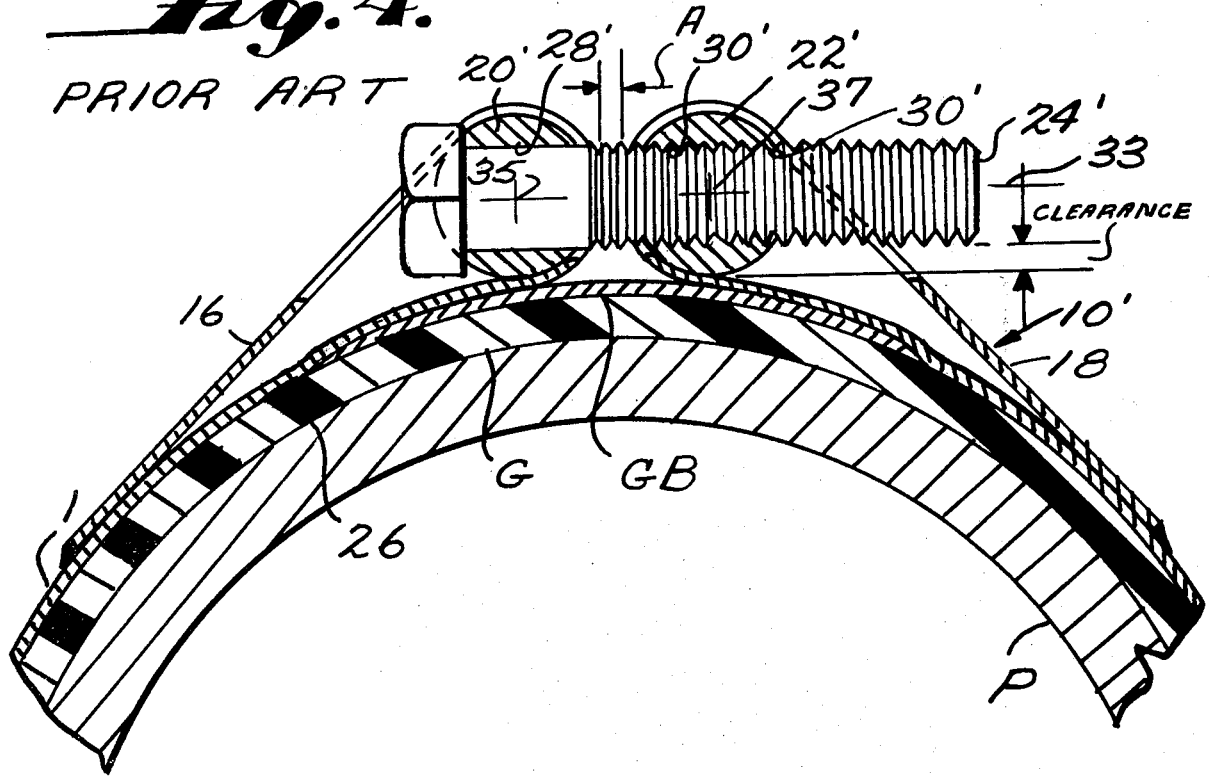
FIG. 4 is an enlarged fragmentary vertical sectional view of a prior art pipe clamp, the view illustrating the use of the clamp on a minimum diameter pipe of a particular size pipe.
Figure 6:
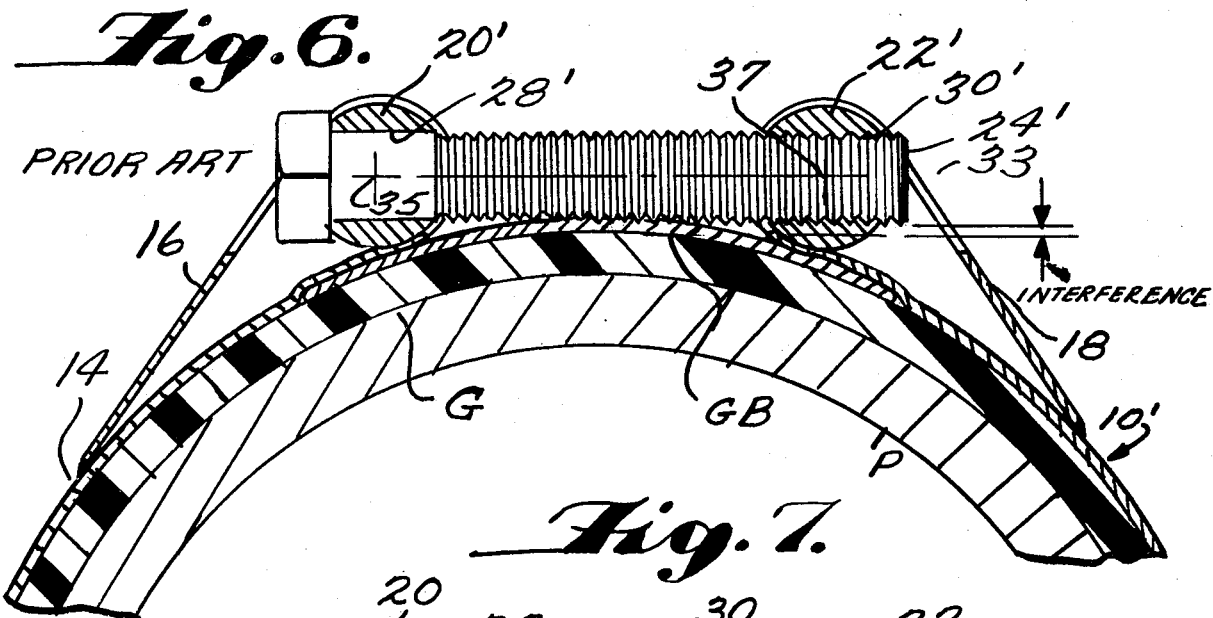
FIG. 6 is a fragmentary vertical sectional view of the prior art clamp of FIG. 4 but illustrating the clamp in use on a maximum diameter pipe of a particular size and disclosing the interference between the bolt and the flexible band means.

Pipe clamps of the prior art such as shown in FIGS. 4 and 6 have a limited range of outside diameters for a particular standard size with which they can be used, as once they are designed for a minimum diameter, the maximum diameter is determined by the situation when the bolt through the trunnion loading bars interferes with a component of the band means, for example, the gap bridge. When this interference occurs, bending loads are created on the bolt means and oftentimes the interference is such as not to permit further tightening of the band means about the pipe and, thus, the compressive load on the gasket is not sufficient for its intended sealing purposes.

In the prior art pipe clamps as shown in FIGS. 4 and 6, the trunnion bars 20' and 22' extending through the looped ends 16 and 18 of the band means 14 are provided with apertures 28' and 30' for receiving a threaded bolt 24'. In this arrangement, the aperture 28' is shown as unthreaded, while the aperture 30' is shown as threaded. It is important to note that in the prior art arrangement, the axis 33 for the bolt 24' extends transversely through each of the longitudinal axes 35 and 37 of the apertures 28' and 30'. FIG. 4 discloses the prior art clamp 10' encircling a given or particular standard size pipe P having a minimum diameter expected to be encountered and tightened thereon to apply or transmit sufficient compressive load to the gasket G for sealing. The looped ends 16 and 18 have the necessary gap A therebetween which insures that a proper load has been placed on the gasket G. If there were no gap A and the looped ends 16 and 18 engaged one another, then there would be no way of knowing if the gasket G was loaded sufficiently. In FIG. 6, the given or particular standard size pipe P has the maximum diameter expected to be encountered, but it will be noted that when the clamp has been applied and if proper tension has been exerted on the band means 14, there would have been an interference of the bolt 24' with the gap bridge. In the drawing, and for the purpose of emphasis, the bolt 24' is shown digging into the gap bridge GB, but, of course, this is impractical because it would destroy the gap bridge or provide sufficient bending loads on the bolt to cause the same to bend. Consequently, the prior art clamp 10' could not be used on this given or particular standard size of pipe having the expected maximum diameter.

Figure 5:
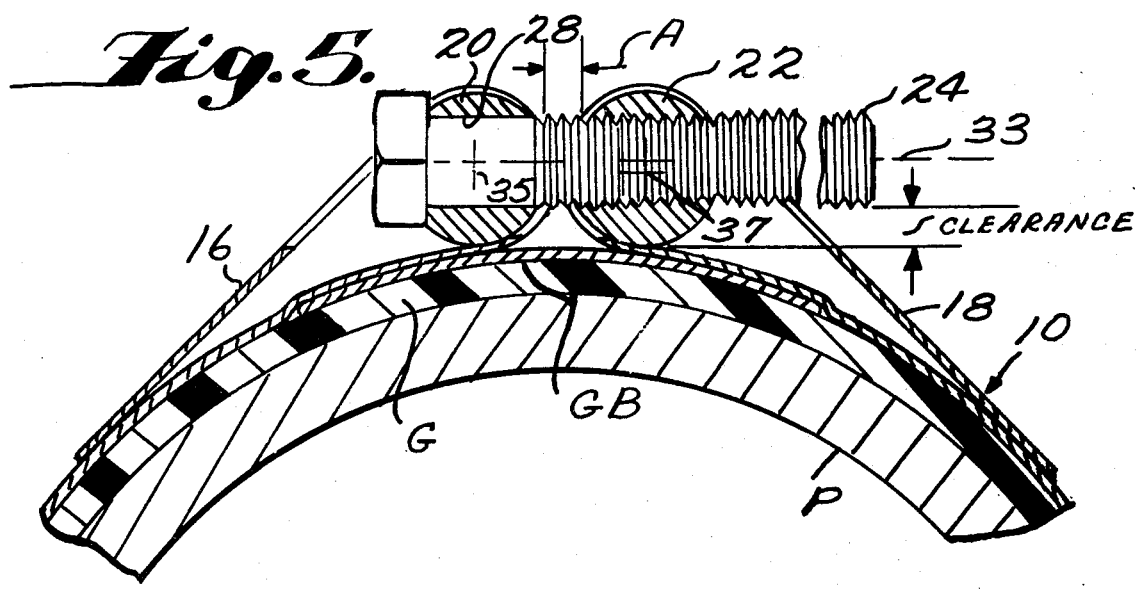
FIG. 5 is a fragmentary vertical sectional view similar to FIG. 4 but illustrating the pipe clamp of the present invention when in use on the same minimum diameter pipe as that of FIG. 4.
Figure 7:
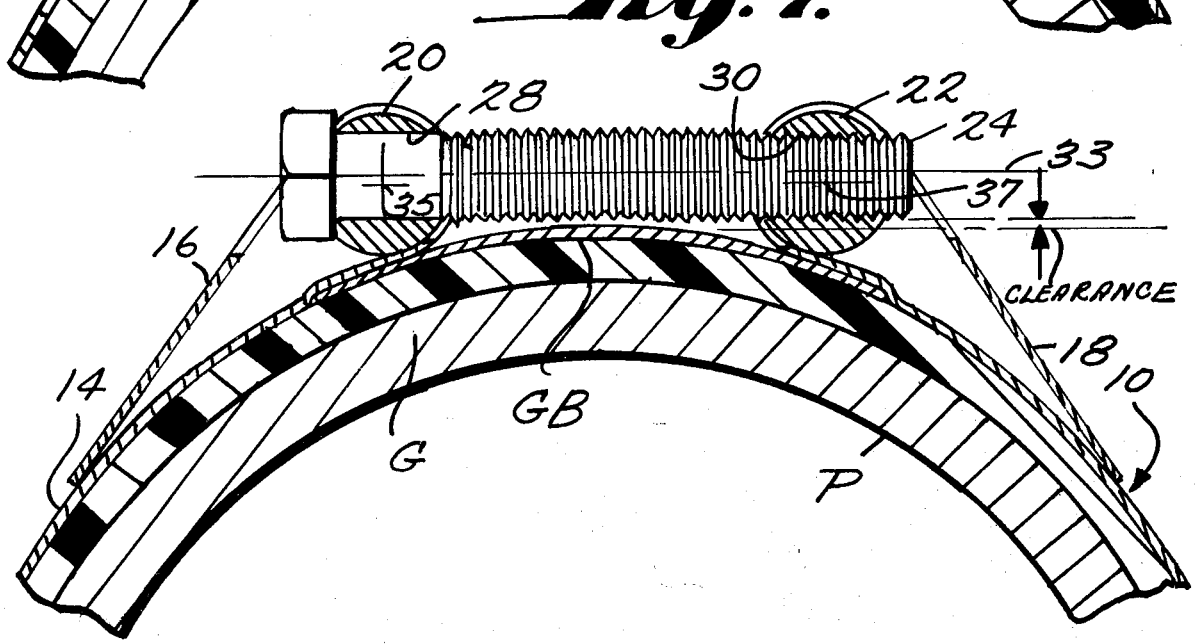
FIG. 7 is a fragmentary vertical sectional view similar to FIG. 6 but illustrating the present invention in use on the same maximum diameter pipe as that of FIG. 6.

Referring now to FIGS. 5 and 7, the pipe clamp 10 of the present invention is shown applied to the same pipe P as illustrated in FIGS. 4 and 6. The pipe clamp 10 of the present invention has the same gap A between the looped ends 16 and 18 on the minimum outside diameter of pipe P as the prior art pipe clamp 10', as shown in FIG. 4, but the clearance is greater so more torque can be applied to the trunnion bars. However, FIG. 7 shows the importance of the clearance on pipes having a maximum outside diameter.

In FIG. 7, the pipe clamp 10 is applied to the pipe P having the same maximum outside diameter as the pipe P in FIG. 6, and it will be noted that when the band means 14 has been tightened to apply sufficient compressive loads to the gasket G, there is still a clearance between the bolt 24 and the gap bridge GB. Thus, the pipe clamp 10 of the present invention is provided with a wider overall range of use on different outside diameters of pipe P for a given or particular standard size.

Figure 10:
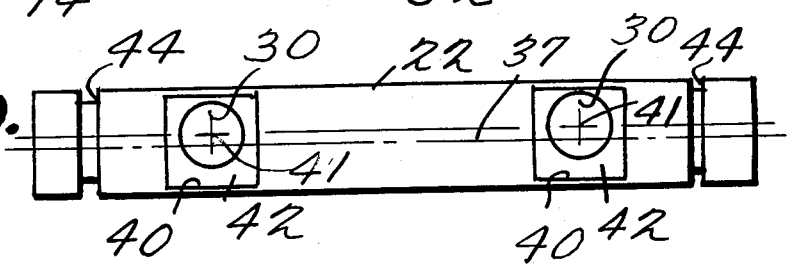
FIG. 10 is a side elevational view of one trunnion loading bar having threaded apertures therethrough having axes offset with respect to the axis of the bar.
Figure 11:
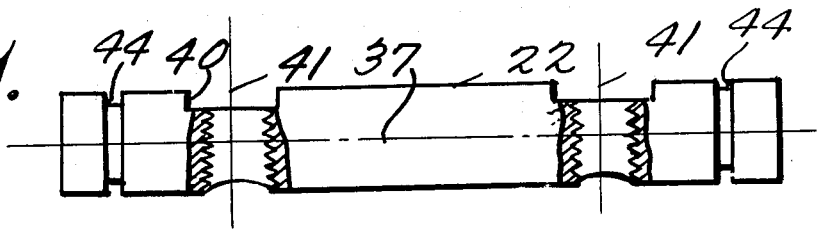
FIG. 11 is a plan view of the trunnion loading bar of FIG. 10 with a portion broken away to illustrate the threaded apertures.
Figure 12:
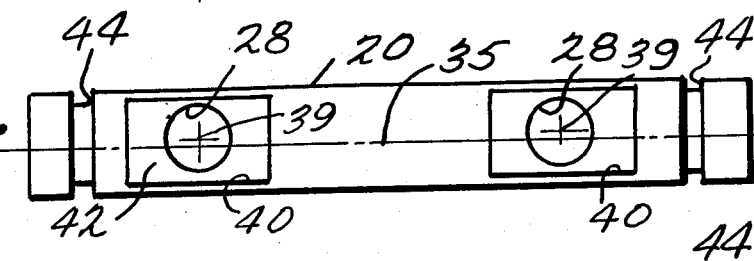
FIG. 12 is a side elevational view of a trunnion loading bar similar to the one illustrated in FIG. 10 but being provided with unthreaded apertures therethrough having axes offset with respect to the axis of the bar.
Figure 13:
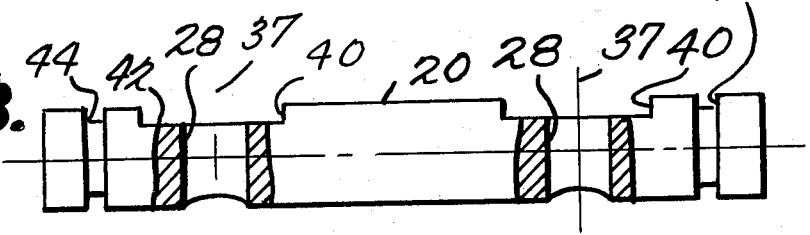
FIG. 13 is a top plan view of the trunnion bar of FIG. 12 with a portion being broken away to show the unthreaded apertures.

To obtain the wider overall range for the pipe clamp 10 of the present invention, the bolt means 24 which may be one or more bolts extending through the trunnion loading bars 20 and 22 has its center line 33 arranged so that it is offset outwardly of the axes 35 and 37 of trunnion bars 20 and 22, respectively. The trunnion bars 20 and 22, as shown in FIGS. 12 and 10, respectively, are provided with the apertures 28 and 30 which extend through the same, and it will be noted that each of these apertures has their axes 39 and 41 offset with respect to the longitudinal axes 35 and 37 of the trunnion bars. Consequently, when the bolt of the bolt means 24 extends through the apertures in the trunnion bars 20 and 22, the bolt's center line, which is coextensive with the axes of the apertures, is offset outwardly of the longitudinal axes of the trunnion bars, although it extends in a direction transversely of the same.

The trunnion bars 20 and 22 are cylindrical and may be made from a solid rod or from a tubular rod. Slots 40 are provided in the wall of the trunnion bars 20 and 22, the slots 40 providing a flat surface 42 surrounding the apertures 28 and 30 and lying in a plane normal to the axes of the apertures. The apertures 30 in the trunnion bar 22 are threaded, whereas the apertures 28 in the trunnion bar 20 are unthreaded. When the trunnion bars 20 and 22 are installed in the looped ends 16 and 18, the bolt head of the bolt of bolt means 24 is arranged to bear against the flat surface 42 of trunnion bar 20, whereas the flat surface 42 of trunnion bar 22 is arranged to face the trunnion bar 20, thus, making it easier to guide the threaded bolt into the threaded aperture 30 of trunnion bar 22. Instead of providing a slot such as 40 in the trunnion bars, the trunnion bars could be D-shaped in cross-section to provide the flat surface surrounding the apertures.

If desired, instead of providing a threaded aperture 30 in trunnion bar 22, the aperture could be unthreaded and a nut could be used for moving the trunnion bars toward each other. In this arrangement, the trunnion bar 22 would have to be positioned in the looped end 18 with its flat surface facing outwardly so the nut could bear against the same. This arrangement is not as preferred as the arrangement shown in the drawings because it is more difficult to assemble such clamp on a pipe in cramped quarters.

The trunnion bars 20 and 22 are frictionally held in the looped ends 16 and 18 prior to installation of the clamp. This is accomplished by providing at least one annular groove 44 on each trunnion bar, the groove 44 being arranged to receive a resilient ring 46 (FIGS. 2 and 3) having an outside diameter slightly greater than the outside diameter of the trunnion bar. The ring 46 holds the trunnion bar in a predetermined relationship in the looped ends 16 and 18, but when the bolt means 24 is tightened to move the trunnion bars toward one another, the friction ring 46 permits the trunnion bars to rotate so that a bending load will not be exerted on the bolt means. By using a friction ring 46 to retain the trunnion bars against both a longitudinal movement and a rotary movement in the looped ends of the band means rather than crimping the looped ends or providing flanges on the trunnion bars, an added advantage is realized as the trunnion bars may be replaced if ever damaged.

The bolts of the bolt means 24 are initially retained in the unthreaded apertures 28 of the trunnion bars 20 prior to assembly of the clamp 10 on the pipe P by means of a flat plastic ring 50 carried by the bolt. The plastic ring 50 is disclosed in FIGS. 1, 2 and 3, but it may be dispensed with, if desired.

Figure 8:
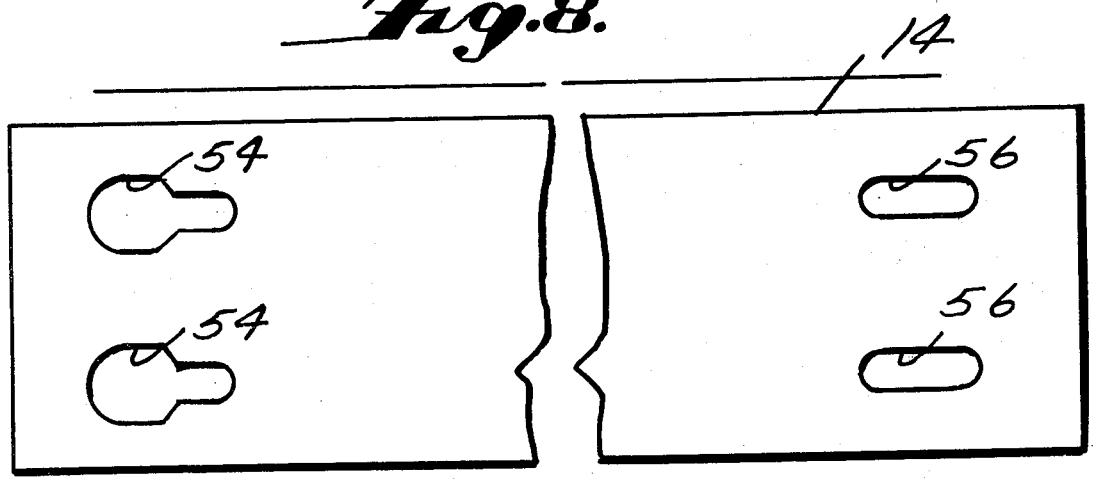
FIG. 8 is a plan view of the sheet metal band of the flexible band means of the pipe clamp of the present invention, the view illustrating the band prior to formation of the looped ends.
Figure 9:
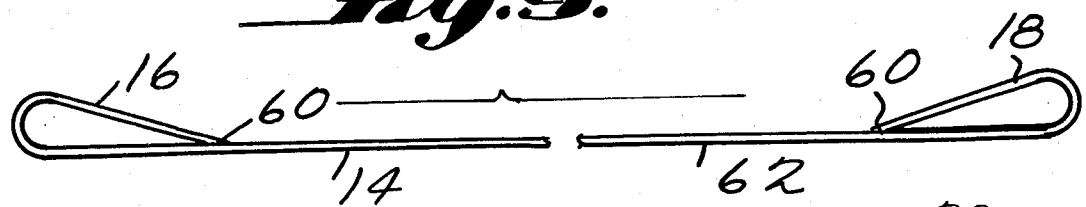
FIG. 9 is a side elevation of the sheet metal band of the flexible band means of FIG. 8 but showing the looped ends formed thereon.

FIGS. 8 and 9 disclose a band means 14 made from a single thickness of sheet material, preferably a sheet metal material. A flat piece of sheet material is laid out as shown in FIG. 8, and cutouts or slots 54 are cut in one end, with additional cutouts or slots 56 being cut in the other end of the same.

The cutouts or slots 54 are shown as having keyhole form, whereas the slots 56 are shown as being elongated or of oval form. Both ends of the flat sheet material could have the same form of slots, but the keyhole design is preferred, and in either case, the width of the slot must be such as to permit the head of the bolt to extend through the same or in the modification where a nut is used on the bolt, the nut must also be able to extend through the same so that neither the bolt head nor a nut, if used, bears against the band means. In forming the band means 14 from the piece of sheet material, the ends of the piece are rolled or bent over to form the looped ends 16 and 18, as shown in FIG. 9, with the rolled over portion being bead welded as indicated at 60. Of course, the rolled over portion could be spot welded or glued to form the looped ends 16 and 18. The gasket G may be of the type shown in U.S. Pat. No. 3,680,180, issued Aug. 1, 1972, to Gould et al and assigned to the same assignee, Mueller Co., Decatur, Ill. In this respect, the gasket G is bonded by a suitable adhesive to the surface 62 of the band means 14 as described in the aforementioned patent, and to this extent, the disclosure therein is incorporated by reference. The band 14 of FIG. 9 provides a single thickness about the portion between welds extending around the exterior of the pipe such as disclosed in FIG. 1.

Figure 14:
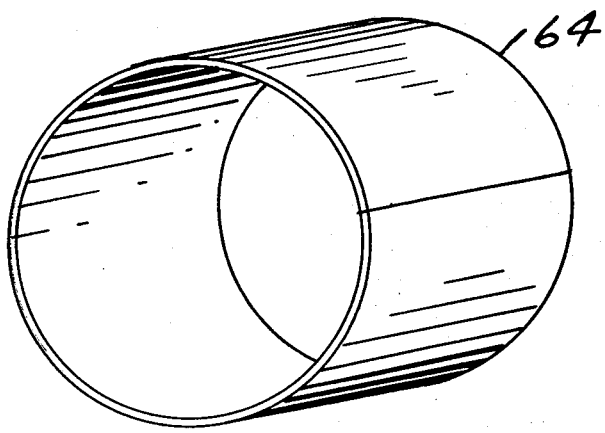
FIGS. 14 through 16, inclusive, disclose a modified form of the sheet metal band of the flexible band means made from a continuous or endless metal sheet.
Figure 15:
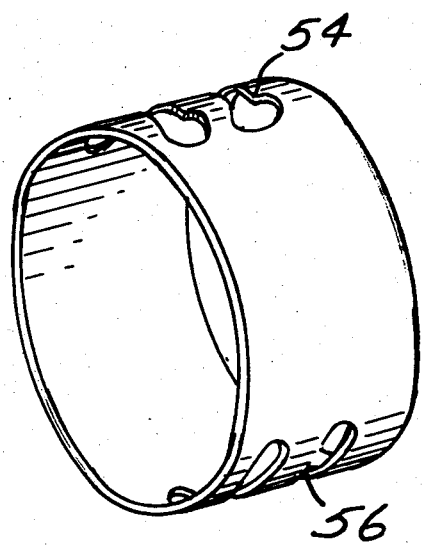
Figure 16:
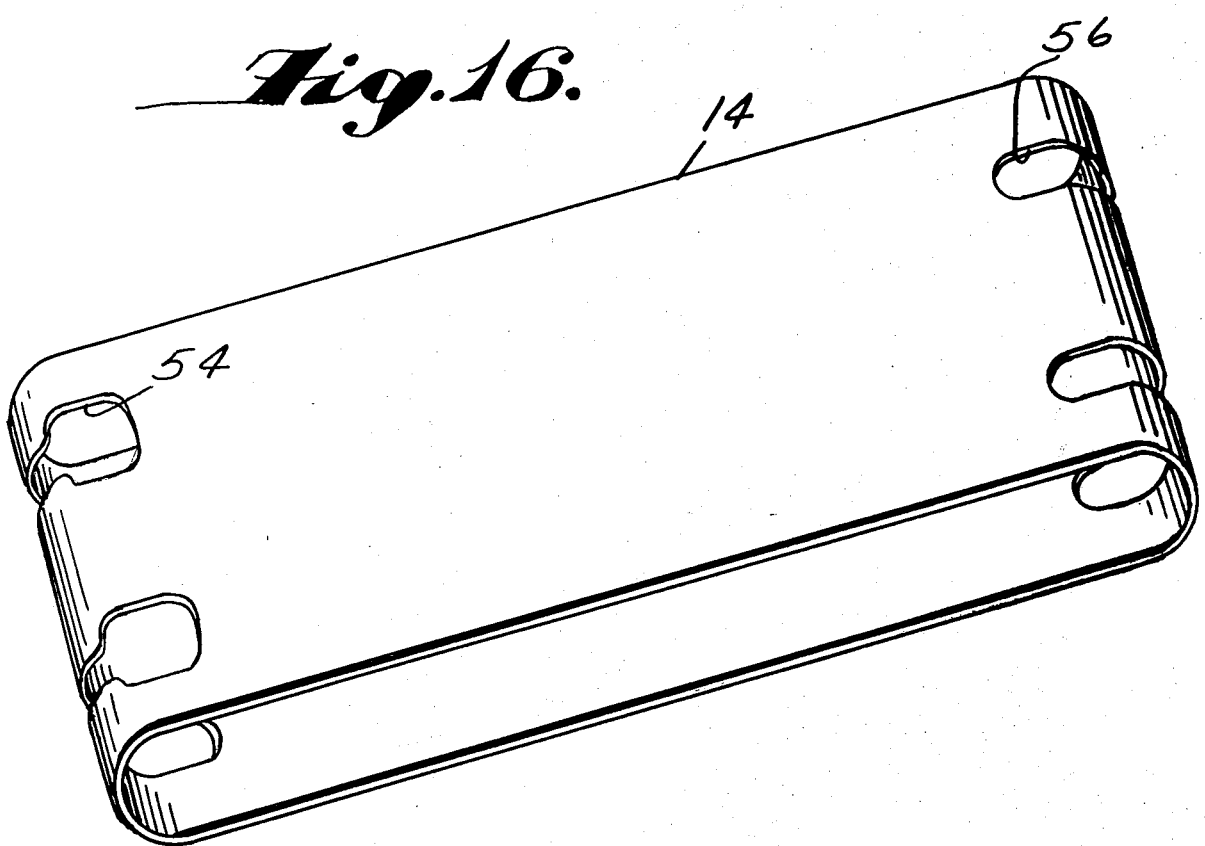

If it is desired to utilize a double thickness for the band means 14, then the band means can be made as shown in FIGS. 14 to 16, inclusive. In this modification of band means 14, a piece of tubular material 64 is cut to a predetermined length, the tubular material 64 having a diameter sufficient for providing a proper length to the band means when the tubular material is flattened out. Cutouts 54 and 56 are then punched or machined into the tubing 64 as shown in FIG. 15. After this operation, the band means is formed by further elongating the tubing, and this could be accomplished by putting two bars inside of the tubing and then moving the bars away from each other to stretch the band to the form shown. When the band means 14 of the type shown in FIG. 16 is assembled as a clamp 14, the band means has a double thickness in the area away from the gap between the looped ends rather than a single thickness between the welds, as shown in the band means of FIG. 1.

The pipe clamp 10 of the present invention accomplishes the objects of the invention in that it has a wider range for minimum and maximum diameters of a particular standard size of pipe. This results from utilizing trunnion bars which have apertures therethrough for the bolt means that are offset outwardly from the longitudinal axis of the trunnion bars when installed in the looped ends of the band means so that when the bolts extend through these apertures, their center line is offset outwardly of the longitudinal axis of the trunnion bars. The particular arrangement described permits the pipe clamp to be used on larger diameter pipes than clamps of the same size made according to the prior art as interference with a component of the band means by the bolt is avoided for a longer period of time. An additional advantage is realized by offsetting the center line of the bolt means outwardly of the center line of the trunnion bars in that, when the bolt means is actuated to move the trunnion bars toward one another, more torque results on the trunnion bars so that they can overcome any friction they might have with the looped ends 16 and 18 of the band means 14. This reduces the bending loads on the bolt and results in the bolt tightening torque being transmitted to the gasket and, thus, increasing the gasket's ability to seal with the pipe.

The terminology used throughout the specification is for the purpose and description of the invention and not limitation of the same, the scope of the invention being defined in the appended claims.

What is claimed is:

1. A low profile pipe clamp for encircling a pipe, said pipe clamp having a use for a wide range of varying outside diameters of a particular size of pipe and comprising:

a split flexible band means having at least one pair of opposed spaced apart looped ends extending in a lengthwise direction of the pipe when the band means encircles the pipe, said looped ends drawn toward one another to tighten said band means about the pipe;

a pair of elongated trunnion loading bars, one of said trunnion loading bars being carried in one of said looped ends and the other of said elongated trunnion loading bars being carried in the other of said looped ends, said trunnion loading bars being rotatable relative to the respective looped ends when the looped ends are drawn together; and bolt means coacting with said trunnion bars for moving said trunnion bars toward one another and drawing said opposed looped ends toward each other so that said band means tightly encircles the pipe, said bolt means including at least one bolt extending through the trunnion bars in each of the looped ends of said opposed looped ends, said bolt having a longitudinal axis extending transverse of and spaced outwardly of the longitudinal axes of said trunnion bars, whereby said bolt avoids interference with said flexible band means when said pipe clamp is used on a pipe having a maximum diameter for a particular size of pipe.

2. A low profile pipe clamp as claimed in claim 1 in which one of said trunnion bars has an unthreaded aperture therethrough and the other of said trunnion bars has a threaded aperture therethrough and wherein said bolt has threads and a head, said bolt extending through the unthreaded aperture and having the head bear on the trunnion bar with same, said bolt being threaded through the opposed trunnion bar having the threaded aperture.

3. A low profile pipe clamp as claimed in claims 1 or 2 including means to frictionally hold said trunnion bars against rotation in said opposed looped ends of said flexible band means prior to assembly of the clamp on the pipe, said friction means permitting said trunnion bars to rotate relative to said looped ends when said looped ends are moved toward one another.

4. A low profile pipe clamp as claimed in claim 3 in which said friction means includes at least one groove in each of said trunnion bars and a resilient friction ring positioned in each groove.

5. A low profile pipe clamp as claimed in claim 2 including means for retaining said bolt in said unthreaded aperture of the trunnion bar prior to assembly of the clamp on the pipe.

6. A low profile pipe clamp as claimed in claim 5 in which said retaining means includes a plastic washer carried by said bolt.

7. A low profile pipe clamp as claimed in claims 5 or 6 including means to frictionally hold said trunnion bars against rotation in said opposed looped ends of said flexible band means prior to assembly of the clamp on the pipe, said friction means permitting said trunnion bars to rotate relative to said looped ends when said looped ends are drawn toward one another.

8. A low profile pipe clamp as claimed in claim 7 in which said friction means includes at least one groove in each of said trunnion bars and a resilient friction ring positioned in each groove.

9. A low profile pipe clamp as claimed in claim 2 in which each of said trunnion bars has a slot in the wall of the same extending transversely with respect to the axis of the aperture in the respective trunnion bar and defining a flat surface surrounding such aperture, said flat surface of the slot surrounding the unthreaded aperture of the one of said trunnion bars providing a bearing surface for the head of said bolt and the flat surface of the slot surrounding the threaded aperture of the other of said trunnion bars facing toward the one of said trunnion bars and providing a guide for threading the bolt in the threaded aperture of the other of said trunnion bars when the clamp is assembled on the pipe.

10. A low profile pipe clamp as claimed in claim 9 including friction means to hold said trunnion bars against rotation in said opposed looped ends of said flexible band means prior to assembly of the clamp on the pipe, said friction means permitting said trunnion bars to rotate relative to said looped ends during assembly when said looped ends are being drawn toward one another.

11. A low profile clamp as claimed in claim 10 in which said friction means includes at least one groove in each of said trunnion bars and a resilient friction ring positioned in each groove.

12. A low profile pipe clamp as claimed in claims 9, 10 or 11 including means for retaining said bolt in said unthreaded aperture of the one of said trunnion bars prior to assembly of the clamp on the pipe.

13. A low profile pipe clamp as claimed in claim 12 in which said retaining means includes a plastic washer carried by said bolt and engaging the looped end on the exterior thereof to entrap the one of said trunnion bars between the same and said bolt head.

14. A low profile pipe clamp as claimed in claims 1 or 2 in which said looped ends of said split flexible band are provided with slots therein for receiving said bolt.

15. A low profile pipe clamp as claimed in claim 14 in which at least the slot in the looped end carrying the one of said trunnion bars extends transversely of the looped end with a width at least as great as the head of said bolt.

16. A low profile pipe clamp as claimed in claim 14 in which said split flexible band means is a band having end portions rolled back and secured thereto to form said looped ends.

17. A low profile pipe clamp as claimed in claim 14 in which said band means is an endless band of flexible material having the ends thereof formed into said looped ends, said endless band providing a double thickness about the pipe.

* * * * *